United States Patent [19]
Wolters et al.

[11] Patent Number: 4,836,443
[45] Date of Patent: Jun. 6, 1989

[54] TEMPERATURE-DEPENDENT PRESSURE RELEASE DEVICE FOR PRESSURE VESSELS

[75] Inventors: Johannes-Peter Wolters, Düren; Karl-Heinz Escherich, Eschweiler, both of Fed. Rep. of Germany

[73] Assignee: Kernforschungsanlage Jülich Gesellschaft mit beschränkter Haftung, Jülich, Fed. Rep. of Germany

[21] Appl. No.: 198,636

[22] Filed: May 18, 1988

Related U.S. Application Data

[63] Continuation of Ser. No. 51,491, May 18, 1987, abandoned.

[30] Foreign Application Priority Data

May 24, 1986 [DE] Fed. Rep. of Germany ....... 3617524

[51] Int. Cl.⁴ ............................................. G05D 27/00
[52] U.S. Cl. .................................. 236/92 C; 122/504; 236/101 R
[58] Field of Search ............... 236/92 C, 21 B, 101 R; 122/504, 451.2

[56] References Cited

U.S. PATENT DOCUMENTS

| | | | |
|---|---|---|---|
| 808,707 | 1/1906 | Wadsworth | 236/102 |
| 867,560 | 10/1907 | Currey | 236/21 B X |
| 1,231,044 | 6/1917 | Nayer | 236/102 X |
| 1,726,068 | 8/1929 | Hoeschen | 236/102 |
| 1,735,415 | 11/1929 | Spinney et al. | 236/101 R |
| 1,927,036 | 9/1933 | Johnson | 236/102 X |
| 2,806,455 | 9/1957 | Burkemeier | 122/504 |
| 2,843,325 | 7/1958 | Greenwald et al. | 236/102 |
| 2,849,188 | 8/1958 | Breese | 236/21 B X |
| 3,154,248 | 10/1964 | Fulton et al. | 122/504 X |
| 3,306,109 | 2/1967 | Caparone | 236/102 X |
| 3,443,631 | 5/1969 | Bremer et al. | 165/47 |
| 3,447,746 | 6/1969 | Visos | 236/102 X |
| 4,452,184 | 6/1984 | Vollmer | 122/504 X |

Primary Examiner—William E. Tapolcai
Attorney, Agent, or Firm—Frishauf, Holtz, Goodman & Woodward

[57] ABSTRACT

Thermal expansion from the heating up of a pressure vessel in the form of an elongated cylinder for containing a nuclear reaction is used to produce motion, beginning at a certain limit temperature, which is used to actuate a lever mechanism to open a safety valve which serves also for relief against overpressure. The thermal expansion of the pressure vessel itself may be used as the actuating force or an elongated rod-in-tube differential expansion device located between the pressure vessel and a nearby adjacent wall may be used to actuate the lever mechanism.

1 Claim, 2 Drawing Sheets

TEMPERATURE-DEPENDENT PRESSURE RELEASE DEVICE FOR PRESSURE VESSELS

This application is a continuation, of application Ser. No. 51,491, filed May 18, 1987, now abandoned.

The invention concerns a device for temperature-dependent pressure relief for pressure vessels whereby at a prescribed temperature a closure device is opened which is located in a relief line of the pressure vessel.

Pressure vessels which contain internal heat sources need to be relieved of pressure when the vessel temperature has reached a predetermined value. This can occur, for example, when there is a failure in an automatic cooling system with which the vessel is provided.

Such vessels are to be found in small, high-temperature reactors, for example. Such reactors have steel pressure vessels which at operational pressure should not be heated above 400° C. Small, high-temperature reactors are so constructed that, in case of a failure of the forced cooling the heat resulting from the decay of radioactive fission products is transferred via the outer vessel surface to the surface coolers surrounding the vessel without allowing the temperatures in the interior of the vessel or in the vessel walls to go above the maximum permissible temperature. The vessel temperature does not go above 400° C. unless there is a failure of redundant surface coolers. Such a case is indeed highly improbable.

Usually the pressure vessel is only protected from excessive pressure, by a safety valve or by several safety valves of staggered response pressure. Safety valves which can be opened by an actuator against the closing force of the valve are well known. A disadvantage of these valves is that control errors can lead to an unintended opening of the primary circulation system of the reactor. Furthermore, to open the valve, auxiliary energy is required.

SUMMARY OF THE INVENTION

It is an object of the present invention to provide a relief device for pressure vessels responsive to a temperature limit by which a shut-off device in the relief line of the vessel is opened automatically and with high reliability at the limit temperature without requiring any auxiliary energy.

Briefly, an elongated construction element exposed to the temperature of the pressure vessel, having one end fixed in place, has its other end subject to displacement with dependence upon temperature expansion and connected to the shut-off device of the pressure relief channel. The thermal expansion of the construction element located in the high-temperature region of the vessel is utilized to actuate the closure device of the relief channel. An embodiment of the device of the invention having particular advantage makes use of the pressure vessel itself as the elongated construction element. The vessel can for example be an upstanding long steel cylinder with its bottom end fixed in place. The upper part of the vessel accordingly shifts upwards with the heating up of the vessel. A wall which is likewise fixed in place on the floor or other supporting structure to which the bottom of the vessel is fixed, is located alongside the vessel. Thus a point of the top part of the vessel and a point of corresponding height on the wall are relatively movable with respect to each other. They are connected together by a lever mechanism which responds to the relative movement of the points previously mentioned and if that relative movement exceeds a predetermined amount, a closure device such as a spring-loaded safety valve connected to the vessel interior is opened by the lever mechanism.

The relative movement of the points respectively on the wall and on top of the vessel can, of course, also be used for opening closure units of other types. Similar examples are breaking through a rupture disc or the opening of a check valve against the existing internal pressure of the vessel.

Another embodiment of the device of the invention utilizes a rod fixed to the pressure vessel as the responsive construction element. This rod can be guided in a manner permitting free movement within a tube, both tube and rod being connected together at one end. The tubular container and rod in this case consist of materials having different coefficients of thermal expansion and are so disposed that both are heated to the same temperature through the pressure vessel wall. If the temperature rises, the free body ends (the upper end of the tube and the free end of the rod) shift relative to each other. This shift is transmitted to the actuating rod of a safety valve when the shift exceeds a predetermined measure. The safety valve is then opened.

The device of the invention is distinguished by its completely autonomous function. Neither a control system nor auxiliary energy is necessary, since the vessel temperature to be monitored leads directly to performance of the necessary protective action, either by the thermal expansion of the pressure vessel itself or by thermal expansion bodies (the construction element) heat-coupled to the vessel. This guarantees a high reliability in the situation in which the device is required to respond.

Since the device of the invention is used in connection with a safety valve that needs in any event to be provided and the mechanism cannot come into action except when the temperature of the pressure vessel is excessive, the probability of a casual opening of the pressure vessel is practically not raised. Monitoring of the functional readiness of the device during operation, as is necessary with a pneumatic or hydraulic actuator, is not necessary. The technical expense as a whole and the other costs connected therewith are unusually small, although a substantial amount of supplementary safety is obtained.

BRIEF DESCRIPTION OF THE DRAWINGS

The invention is further described by way of illustrative examples with reference to the annexed drawings, in which.

DESCRIPTION OF THE ILLUSTRATED EMBODIMENTS

Figure 1:
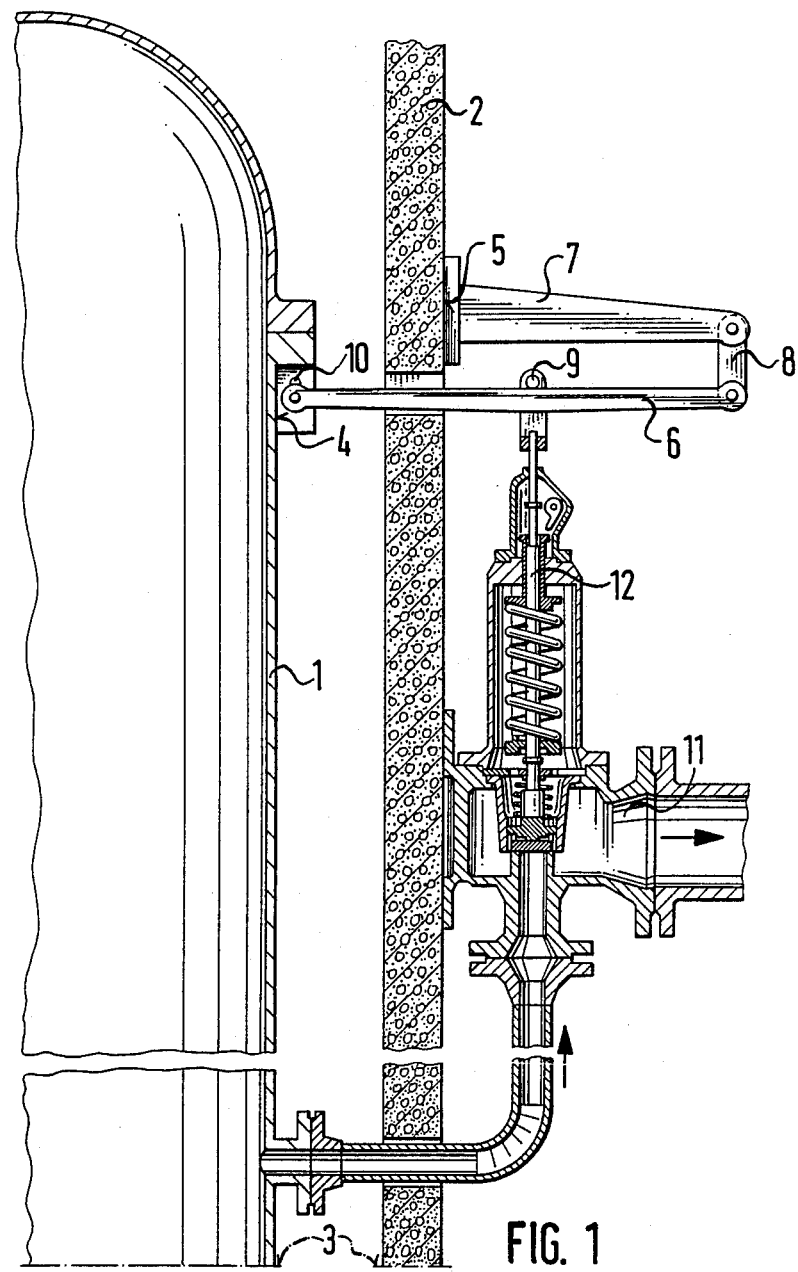
FIG. 1 is a side view of a device according to the invention with a portion of the pressure vessel and a neighboring wall, as well as a safety valve, shown in section.

As shown in FIG. 1, the upstanding cylindrical steel pressure vessel 1 is itself a temperature-sensitive construction element which is located next to the wall 2. Both the vessel and the wall are fixed in place on the floor 3. The vessel and wall respectively have relatively movable points 4 and 5 between which a mechanism composed of the parts 6–9 is mounted. The lever 6 is linked to the point 4 of the vessel 1 in a manner permitting vertical play and that vertical play, provided and measured by the slot 10, is such that an end point of the lever 6 is moved by the upwardly expanding vessel only after a predetermined amount of thermal expansion of the vessel has taken place. The other end of the lever is fixed in the vertical direction by the bracket 7 mounted on the concrete wall 2. The linking lever 8 prevents the mechanism from providing horizontal fixation of the vessel and thereby assures that the mechanism will not be loaded in the case of an earthquake.

The spring loaded safety valve 11 is likewise fixed in place by the wall 2. That has the result that the actuating rod 12 of the safety valve 11 is raised by the link piece 9 as soon as the thermal expansion of the vessel shifts upwards the end of the lever 6 linked onto the pressure vessel.

Figure 2:
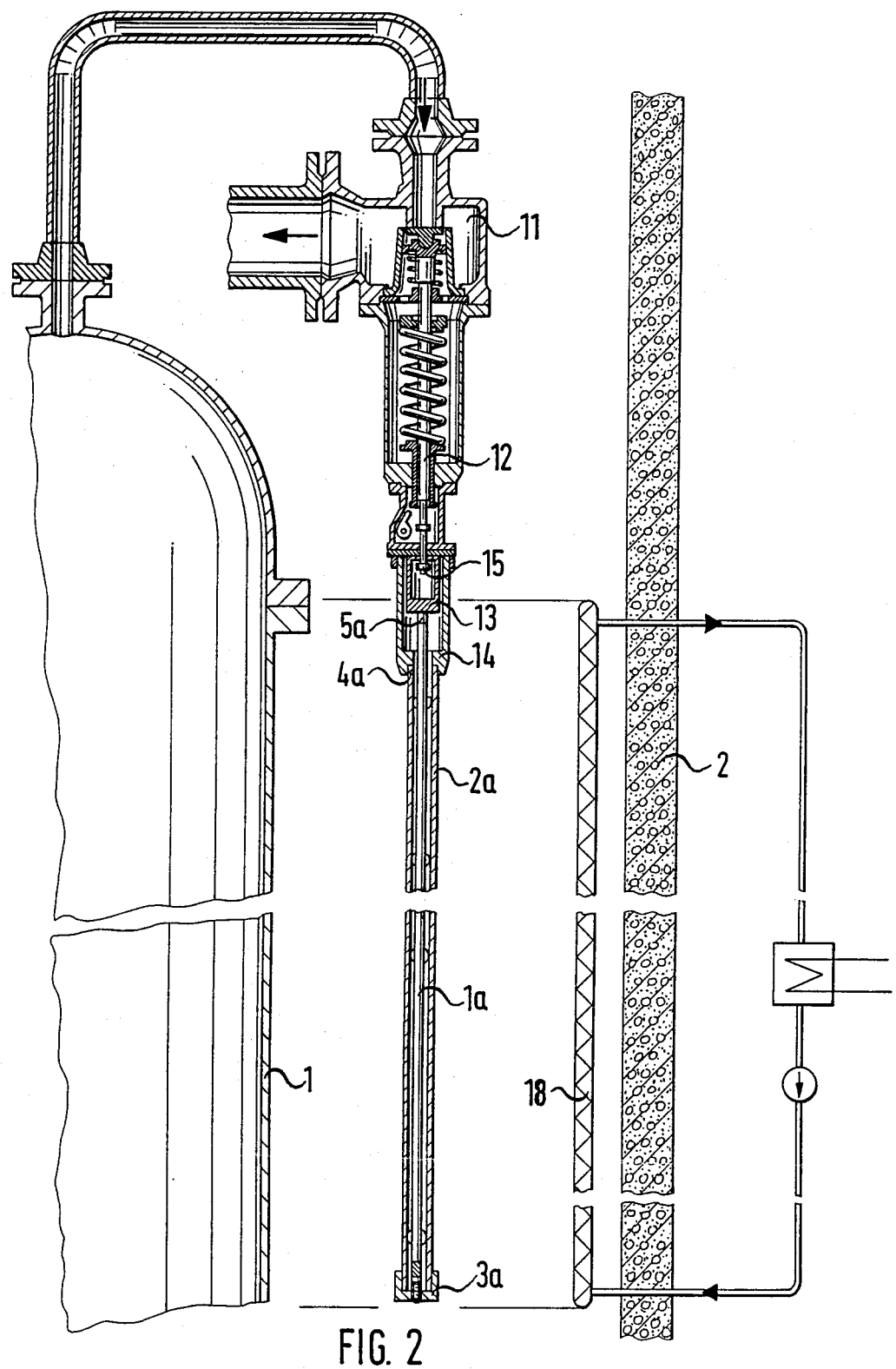
FIG. 2 is a sectional view of another embodiment of a device according to the invention utilizing a tube and a rod movable within it as the temperature sensitive element.

FIG. 2 shows an embodiment of the device of the invention in which the thermally sensitive construction element consists of a rod 1a guided in the interior of an outer tube 2a, the tube and rod being fixedly connected to each other at their lower ends by a screw cap 3a. The points 4a of the tube and 5a of the rod are movable. The materials of the tube and rod are so chosen that the tube has a higher thermal expansion coefficient than the rod. That means that upon heating up of both bodies, the grip element 13 connected to the upper end of the rod 1a is drawn deeper into a shell 14 connected with the tube. Beginning with a certain depth, the grip element 13 grasps the nut 15 of the valve actuating rod 12 and thereby opens the safety valve 11.

The device thus described is located in the gap between the vessel 1 which is to be protected and the surface coolers 18 located on the inner surface of the wall 2. A sufficient heat coupling to the pressure vessel is thereby provided. That results from the fact that a temperature approximately equal to the temperature of the vessel wall is established in the gap when the surface cooler 18 fails. The temperature rise in the vessel wall, moreover, proceeds so slowly that the heat expansion bodies are able to follow this temperature development without the need of any great temperature difference.

Although the invention has been described with reference to two illustrated embodiments, it will be recognized that further variations and modifications are possible within the inventive concept.

We claim:

1. Apparatus for temperature-dependent pressure relief of a pressure vessel having a pressure relief channel equipped with shut-off means for closing said relief channel during normal operation of a reaction within said pressure vessel, wherein:

said pressure vessel has a first end thereof firmly fixed in position relative to a foundation and a second end oppositely located to said first end and which is free to move towards and away from said first end in response to thermal expansion and contraction of said pressure vessel;

said relief channel is mechanically connected to said pressure vessel only near said first end of said pressure vessel and extends outside said pressure vessel and spaced therefrom to said shut-off means;

mechanical means are provided which are responsive to movement of a portion of said pressure vessel near said second end thereof produced in response to thermal expansion of said pressure vessel, for forcing open said shut-off means when the temperature of said pressure vessel exceeds a predetermined temperature;

said shut-off means are located nearer to said second end than to said first end of said pressure vessel and at a location providing some protection from the effect of heat given off by said pressure vessel, and said shut-off means and a portion of said mechanical means are mounted on a wall of a structural material of low heat conduction, spaced from said pressure vessel and separating said shut-off means from said pressure vessel.

* * * * *